US005835134A

United States Patent [19]

Thacker

[11] Patent Number: 5,835,134

[45] Date of Patent: Nov. 10, 1998

[54] CALIBRATION AND MERGING UNIT FOR VIDEO ADAPTERS

[75] Inventor: Charles P. Thacker, Palo Alto, Calif.

[73] Assignee: Digital Equipment Corporation, Maynard, Mass.

[21] Appl. No.: 542,490

[22] Filed: Oct. 13, 1995

[51] Int. Cl.[6] .......... H04N 17/00; H04N 17/02

[52] U.S. Cl. .......... 348/180; 348/552; 348/511; 345/435

[58] Field of Search .......... 348/180, 181, 348/511, 522, 558, 540, 542, 556; 345/435, 132, 115, 154; H04N 17/00, 17/02

[56] References Cited

U.S. PATENT DOCUMENTS

| | | | |
|---|---|---|---|
| 4,183,045 | 1/1980 | Herrmann et al. | 358/22 |
| 5,155,595 | 10/1992 | Robison | 358/149 |
| 5,327,156 | 7/1994 | Masukane et al. | 345/113 |
| 5,345,554 | 9/1994 | Lippincott et al. | 395/162 |
| 5,402,147 | 3/1995 | Chen et al. | 345/115 |
| 5,404,437 | 4/1995 | Nguyen | 395/152 |
| 5,438,663 | 8/1995 | Matsumoto et al. | 345/132 |
| 5,611,033 | 3/1997 | Pitteloud et al. | 345/435 |
| 5,621,869 | 4/1997 | Drews | 345/435 |

FOREIGN PATENT DOCUMENTS

| | | | |
|---|---|---|---|
| 0247710 | 3/1987 | European Pat. Off. | G09G 1/16 |
| 0273416 | 12/1987 | European Pat. Off. | G09G 5/18 |
| 0661686 | 12/1987 | European Pat. Off. | G09G 5/18 |

*Primary Examiner*—Michael Lee
*Assistant Examiner*—Vivek Srivastavia
*Attorney, Agent, or Firm*—Dirk Brinkman

[57] ABSTRACT

In a computer system, a system video adapter and an add-on video adapter generate video signals according to different dimensional characteristics. The dimensional characteristics of the system adapter are calibrated by a calibration unit so that the video signals can simply be merged. The calibration unit comprises a comparator for detecting pixel signals of calibration lines generated by the system adapter at predetermined horizontal and vertical positions of a display device. The comparator, in response to detecting the pixel signals exceeding a predetermined reference signal, cause a latch to store counts of a counter. The counts represent the horizontal and vertical positions of the detected signals. The counts are presented to the add-on video adapter as calibration parameters. The add-on video adapter can use the calibration parameters to generate video signals which can be directly merged with the video signals of the system video adapter.

7 Claims, 7 Drawing Sheets

CALIBRATION AND MERGING UNIT FOR VIDEO ADAPTERS

FIELD OF THE INVENTION

This invention relates generally to processing video signals, and more particularly to merging video signals generated by graphic adapters.

BACKGROUND OF THE INVENTION

In a personal computer (PC), a "system" video graphic adapter typically is the internal hardware circuitry that gives the PC the capability to display graphic image, in addition to text. Most system graphic adapters include random access memories where data representing graphic images can be assembled and stored as pixels. The pixels can be generated by, for example, conventional graphic and windowing software.

Each pixel encodes color and intensity information in bit fields. Convertors operating on the bit fields at a predetermined fixed pixel clock rate can be used to transform the digital pixels to analog color signals. The color signals represent the intensity and color of the pixels. Usually, the color signals include red, green, and blue (RGB) components for display on a video monitor.

Using raster scan lines, horizontal and vertical synchronization signals determine the two-dimensional position of the color signals on the video monitor. These signals, in combination, define the dimensions and contents of the graphic images presented on the video monitor. Graphic adapters with different pixel resolutions (e.g., CGA 320 by 200, VGA 640 by 480, etc.) are known. The trend in the industry is towards high-resolution and higher-performance graphic adapters. Megapixel adapters having resolution of 1024 by 1024 or higher have become available.

In addition to system video graphic adapters, PCs may be equipped with specialized "add-on" video adapters. These add-on adapters may be used for specialized video signal processing, such as, for example, Motion Pictures Expert Group (MPEG) decoding of real-time videos. It may be desirable to simultaneously display real-time video within relatively static graphic windows of the video monitor.

In order for an add-on adapter to merge its video signals with the video signals generated by the system adapter, the add-on adapter must determine the dimensional characteristic of the system adapter to a high degree of accuracy. The dimensional characteristics of the system adapter include the horizontal and vertical spacing of raster lines, as well as the spacing of the pixels on the horizontal scan lines. While it is relatively easy to decode the horizontal and vertical synchronization signals of the system adapter, it is not so easy to determine the rate at which the pixels are being generated.

The rate of pixel generation, as controlled by the pixel clock, determines the horizontal resolution of the adapter. However, because of the rapid and unpredictable fluctuation of the voltages of the analog color signals, it is difficult to extract the frequency of the pixel clock directly from the video color signal.

In addition, system adapters usually generate more pixels per scan line and more scan lines per frame than the stated resolution of the system adapter. These hidden pixels and hidden scan lines are not displayed because they fall into the horizontal and vertical "blanking" areas located in the periphery of the video monitor screen. Unfortunately, not only do the sizes of the horizontal and vertical blanking areas vary for different monitors, but also the exact sizes of a particular monitor's blanking areas are usually not explicitly determinable.

For example, if the "display" resolution is 640 by 480, then the actual "total" resolution, including blanking areas, may be 700 by 500. This means, in this particular instance, that 60 pixels are consumed during horizontal blanking, e.g., 30 for the right and left edge each, and 20 scan lines during vertical blanking, e.g., 10 each at the top and bottom of the screen.

These differences in dimensional characteristics make it very difficult to merge video signals generated by add-on adapters with signals generated by system adapters. In the prior art, chroma-keying techniques have been used to merge color video signals. Chroma-keying techniques generally require relatively complex color detecting circuitry, and circuits which substitute "add-on" video signals for predetermined detected "system" color signals. Moreover, chroma-keying techniques generally require that the dimensional characteristics of the signals to be merged are substantially the same. Even if the system and add-on adapters have the same dimensional characteristics, the merged images can be imprecise because of signal drift and variations in the sizes of the blanking areas, causing a blurring at the edges of the merged images.

If video signals from more than one adapters are to be merged, then the prior art generally requires a high degree of communication between the adapters. The communication has been by direct interconnects, or by users of the system. In general, these requirements increase the cost and complexity of the system.

In most modem PCs, a plug-in-and-go architecture is state-of-the-art. I/O adapters, other than video, can easily be plugged into a PC without requiring direct interaction with other adapters and users. Typically, the adapters are automatically "configured" during their installation, with minimal attention by the user of the system.

Therefore, it is desired to provide a low-cost method and apparatus for automatically calibrating the dimensional characteristics of system video graphic adapters so that video signals generated by add-on adapters can simply be merged with a high degree of accuracy.

SUMMARY OF THE INVENTION

In a computer system, a system video adapter and an add-on video adapter generating video pixel signals according to different dimensional characteristics, are calibrated by a calibration unit so that the video signals from the two adapters can be merged by simply overlaying the video signals. The calibration unit comprises, in part, a comparator for detecting pixel signals of calibration lines generated by the system adapter at predetermined horizontal and vertical positions of a display device.

The comparator, in response to detecting the pixel signals exceeding a predetermined reference signal, causes a latch to store counts of a counter, the counts represent the horizontal and vertical positions of the detected pixel signals. The counts are presented to the add-on video adapter as calibration parameters. The add-on video adapter can use the calibration parameters to generate video signals which can be directly merged with the video signals of the system video adapter.

The calibration unit also includes a phase-lock loop circuit to derive pixel clock signals from a horizontal synchronization signal of the system adapter. The pixel clock signal and the horizontal synchronization signals are used to increment the counter. The horizontal synchronization signal and a vertical synchronization signal are used to clear the counter while respectively determining the horizontal and vertical positions of the pixel signals. The selection of horizontal or vertical calibration is done with a pair of multiplexors coupled to the counter.

DETAILED DESCRIPTION OF A PREFERRED EMBODIMENT

Figure 1:
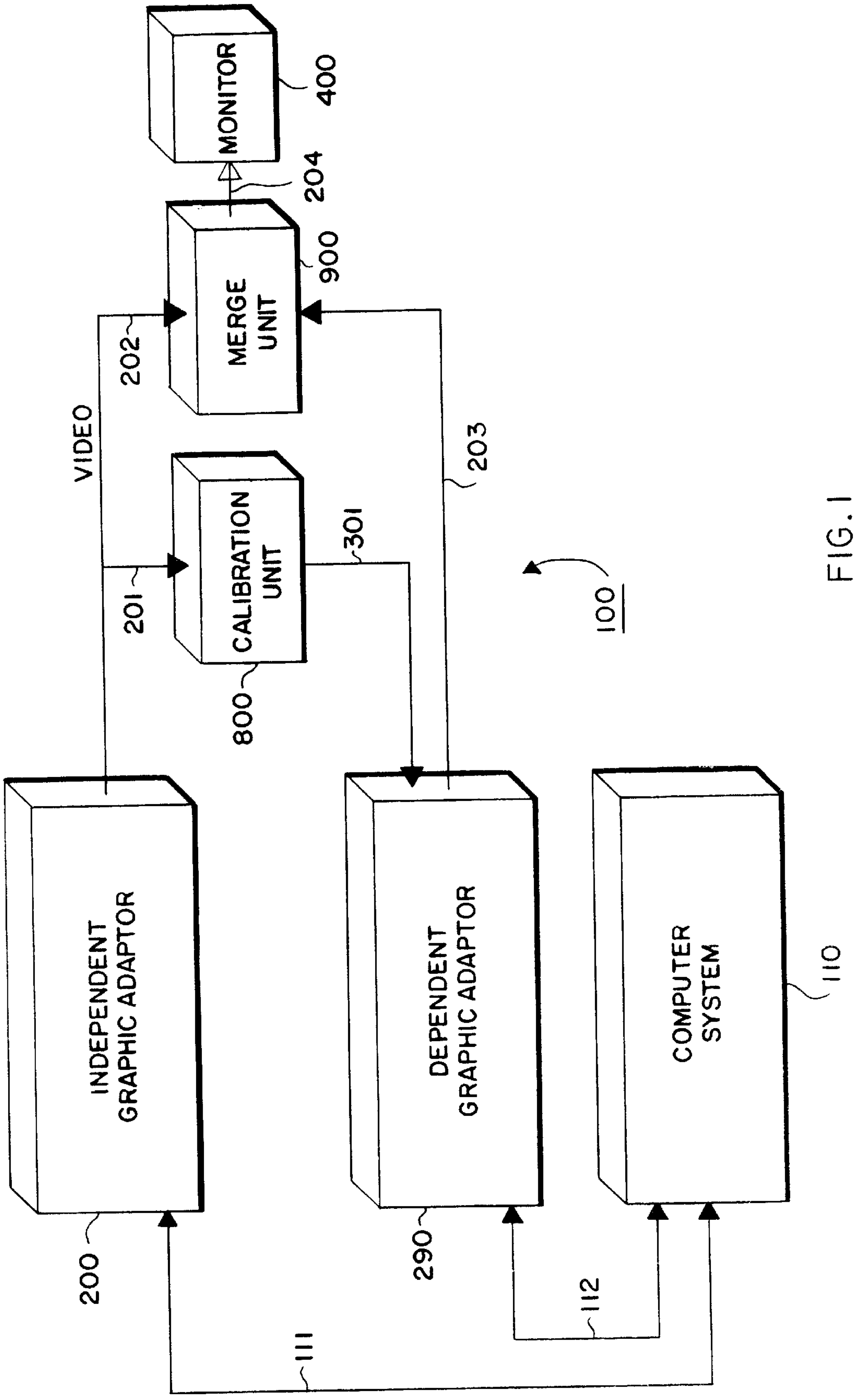
FIG. 1 is a top level block diagram of a computerized graphic presentation system according to a preferred embodiment of the invention.

Now turning to the drawings, FIG. 1 shows a computerized graphic presentation system 100 including an independent graphic adapter 200, a dependent graphic adapter 290, and a standard video monitor 400. The systems 100 also includes a calibration unit 800, and a merge unit 900. The adapters 200 and 290 can be connected to a computer system 110 by lines 111 and 112 for control and data signals.

The independent graphic adapter 200 can be a conventional low resolution "system" video card of the type typically supplied with PCs, e.g., a "VGA" card. The dependent adapter 290 can be a high resolution "add-on" video card possibly configured to do specialized video signal processing such as Motion Pictures Expert Group (MPEG) decoding, or the like.

The computer system 110 can be conventional. The system 110 can include as components, for example, one or more processors, memories, and buses for physically and electrically connecting the components and adapters, e.g., a PC. Physically, the adapters 200 and 290 can be mounted in the system 110, and the calibration and merge units 800 and 900 can be separately configured or mounted on the printed circuit board which form the adapter 290. During operation, the computer system 100 can execute windowing operating system software programs for displaying graphic images on the video monitor 400 in an overlapped or tiled manner, for example Microsoft "Windows."

The independent and dependent adapters 200 and 290 acquire video images, usually in digital form, e.g., as pixel data, or "pixels," from the host computer 110. Alternatively, adapters equipped with analog-to-digital convertors could acquire analog video signals. The adapters 200 and 290 may have different pixel resolutions and use different timing and control signals. This means that the vertical and horizontal positions of the pixels of the adapters 200 and 290 are separately determined, and that the dimensional characteristics of the adapters 200 and 290 are different.

In a preferred embodiment of the invention, the calibration unit 800, as explained in greater detail below, is used to analyze predetermined calibration signals generated by the independent graphic adapter 200 on line 201 in the form of video signals (VIDEO) to generate calibration parameters on line 301. The calibration parameters can be used to adjust the timing of the pixel generation of the dependent adapter 290 to be compatible with the resolution of the independent adapter 200 so that the video signals on line 202 and 203 can be merged to a high degree of accuracy by the merge unit 900. The merged analog signals can be presented to the video monitor 400 on line 204.

Figure 2:
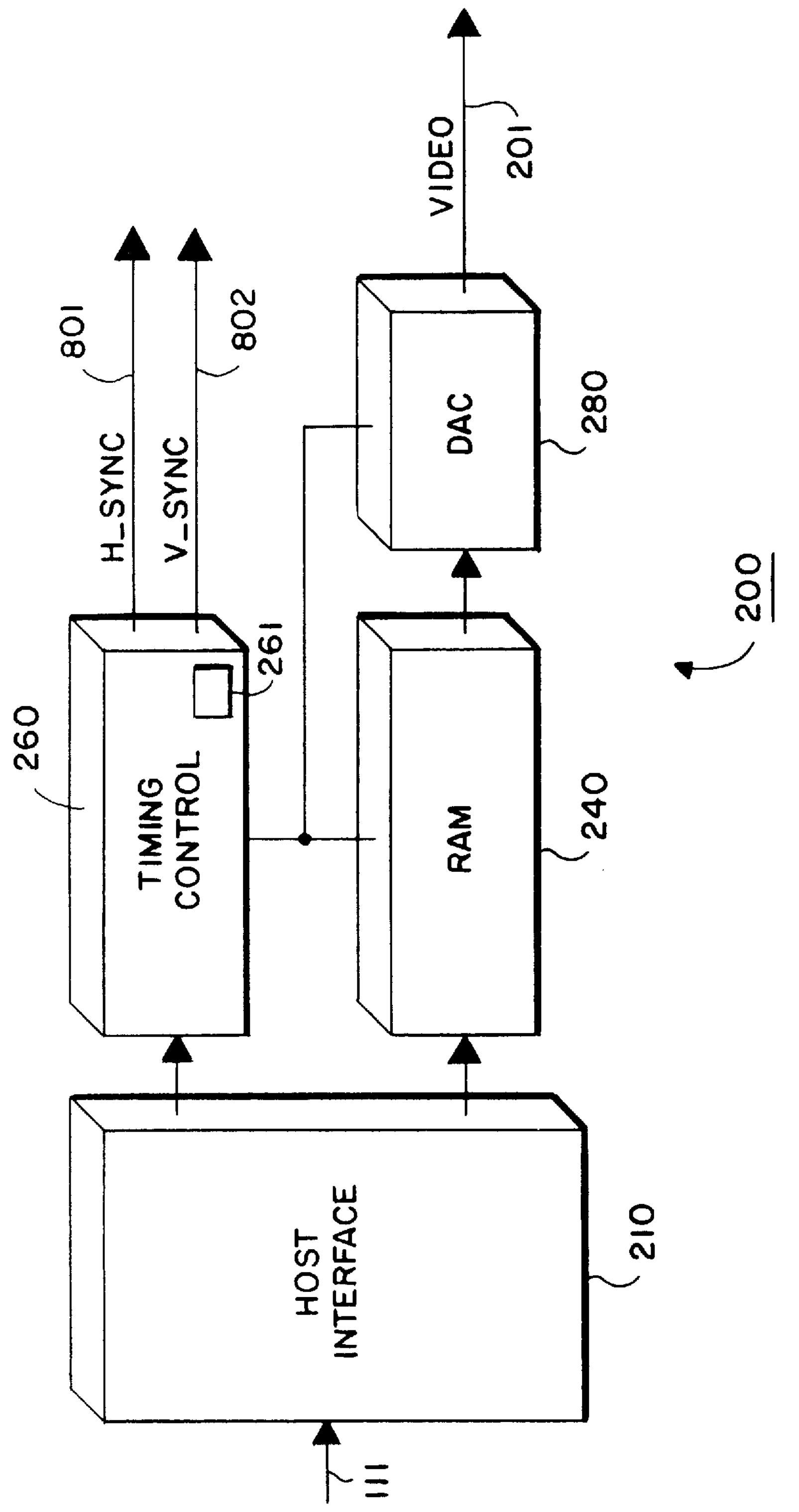
FIG. 2 is a block diagram of a video graphic adapter of FIG. 1.

FIG. 2 shows an exemplary configuration of a graphic adapter, for example, the adapter 200. The adapter 200 includes a host interface 210, a random access memory (RAM) 240, timing and control circuits 260, and a digital-to-analog convertor (DAC) 280. The adapter 200 communicates with the host computer 110 via the interface 210. Pixel data acquired from the host 110 are stored in the RAM 240. The RAM 240 may be partitioned to store the red, green, and blue pixel components of the video signals at separate locations of the RAM 240.

Pixels are read out of the RAM 240 using the timing and control circuits 260. The pixels are converted to analog video signals by the DAC 280. The rate at which pixels are converted is determined by a pixel clock 261 operating at a predetermined fixed frequency. The timing and control circuits 260 can also generate horizontal and vertical synchronization signals (H_SYNC and V_SYNC) respectively on lines 801 and 802. Alternatively, the synchronization signals can be composited with the video signals of line 201 according to industry standard coding techniques, e.g., NTSC.

The dependent video adapter 290 can, generally, be configured in a similar manner as the adapter 200. However, in the presentation system 100 according to the invention, the timing and control signals and the resolution of the adapters 200 and 290, may be different. For example, the dependent adapter 290 can be a modern high performance "full video" adapter having a resolution of 1024 by 1024, whereas the independent adapter 200 has substantially lower resolution, e.g., 640 by 480.

Figure 3:
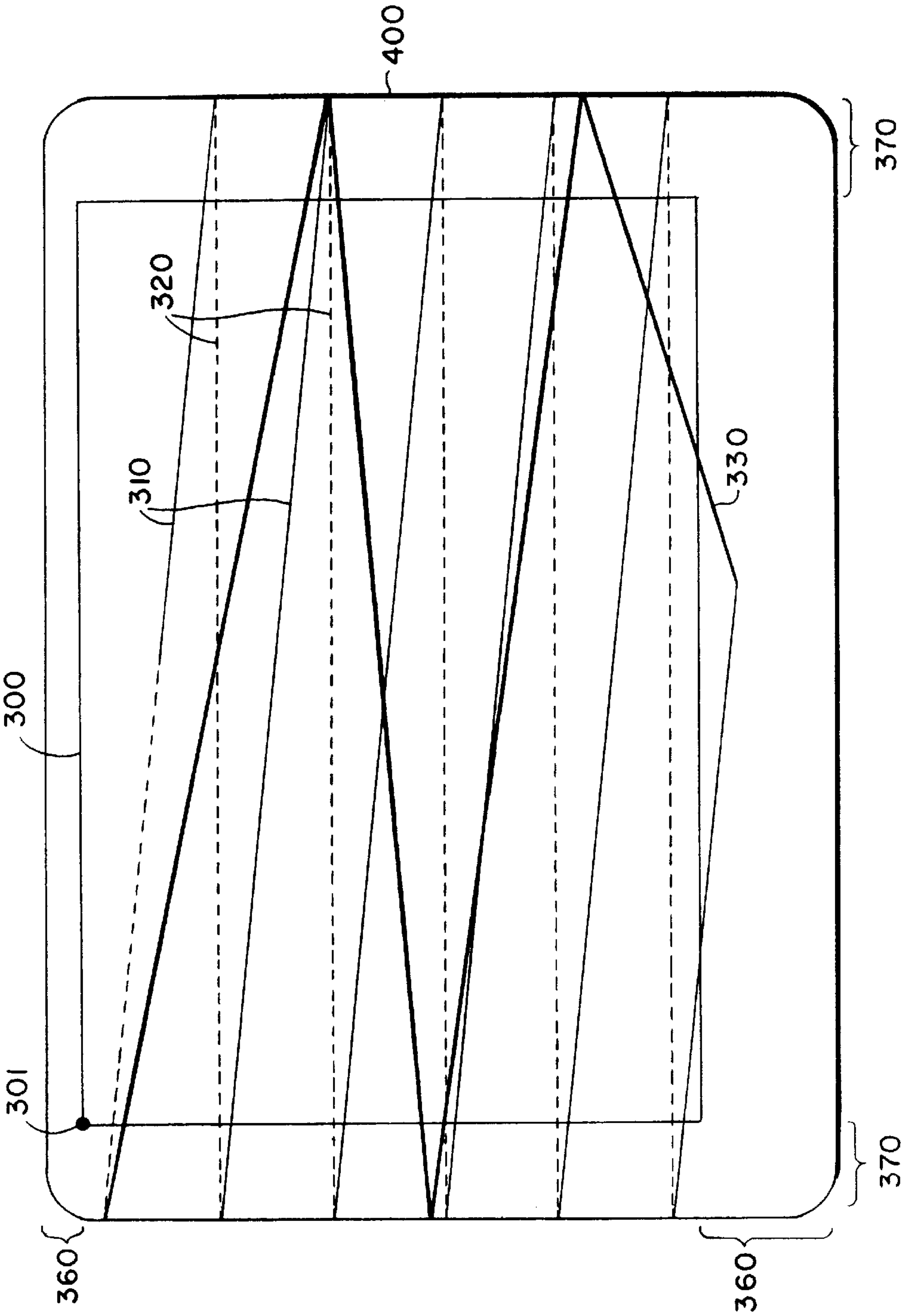
FIG. 3 is a trace of raster scan lines of a video monitor.

FIG. 3 shows example raster scan lines of a frame that can be used to display the video signals on the monitor 400, a frame being a single image. Typically, frames are displayed at a rate of thirty or sixty per second to simulate continuous motion. However, other frame rates may be possible. In the example shown, the slope of the scan lines is exaggerated. It should be noted that the present calibration technique can also be used with interleaved raster tracing methods as known in the broadcast industry.

In FIG. 3, the solid lines 310 generally indicate when pixels can be displayed. The broken lines 320 indicate the horizontal retrace portions of the signals. The heavy solid lines 330 indicates the vertical retrace portions of the signals. Vertical and horizontal blanking is performed in the areas generally indicated by reference numerals 360 and 370. During blanking, pixels are not displayed.

Therefore, for the monitor 400, the useable "viewing window" is generally indicated by the square labeled with reference numeral 300. The window 300 has an "origin" 301, e.g. (0,0). As stated above, the size of the blanking areas along the periphery of the screen of the monitor 400 can vary significantly for monitors of different manufacture. Moreover, monitors having identical resolutions may have different sized blanking areas, and therefore different sized viewing windows.

It is a purpose of the invention to determine to a high degree of accuracy the dimensional characteristics of the independent adapter 200. The dimensional characteristics including the horizontal pixel resolution, the vertical number of scan lines, and the sizes of the blanking areas.

Figure 4:
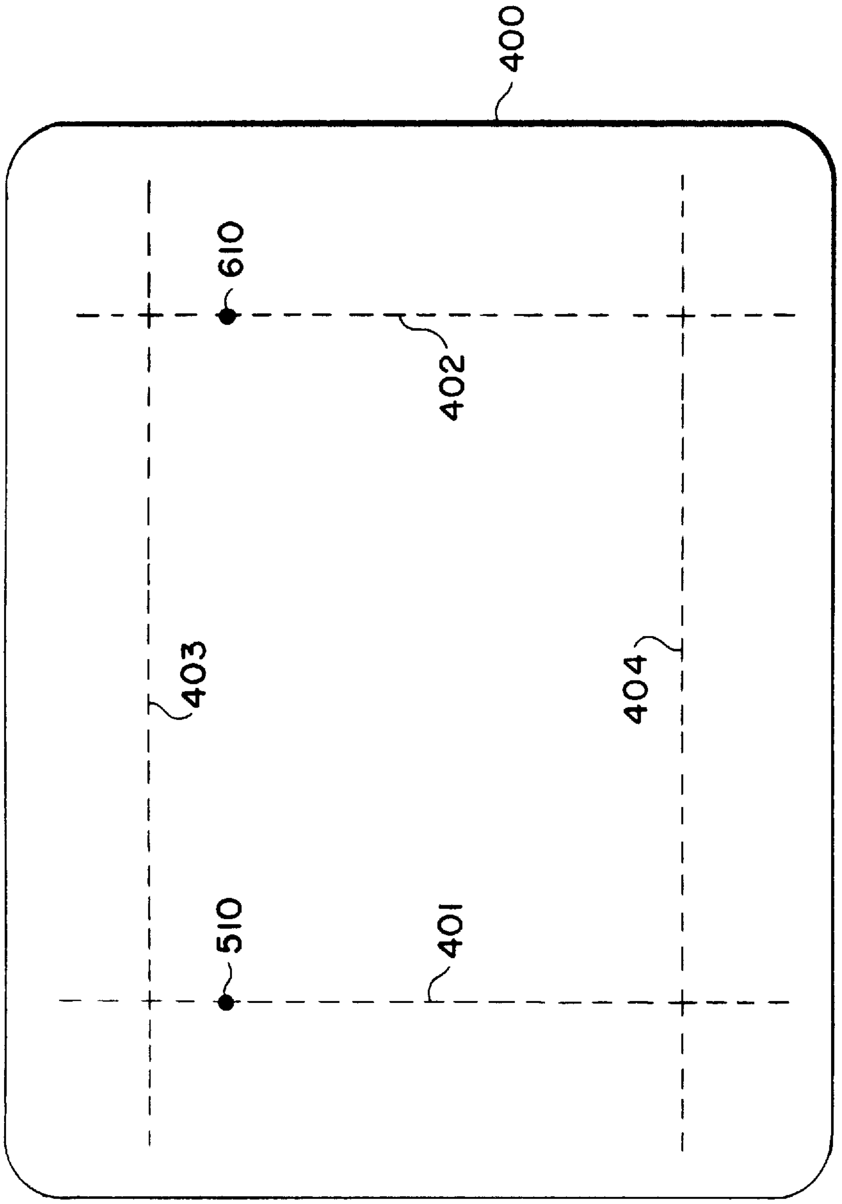
FIG. 4 shows horizontal and vertical calibration.

FIG. 4 shows exemplary calibration lines 401–404. The lines can be displayed on the monitor 400 to determine the dimensional characteristics of the adapter 200. The calibration lines 401–404 comprise, for example, two horizontal calibration lines 401 and 402, and two vertical calibration lines 403 and 404. The calibration lines 401–404 can be generated sequentially by a calibration program interfaced to the independent adapter 200, described below with respect to FIG. 9.

The calibration program can execute in the windowing operating system software environment of the system 110 during "installation" of the dependent adapter 290. Each of the lines 401–404 can be displayed by the independent adapter 200 at predetermined horizontal and vertical positions of the monitor 400 for known intervals of time. The dots 510 and 610, explained below, represent individual pixels.

Figure 5:
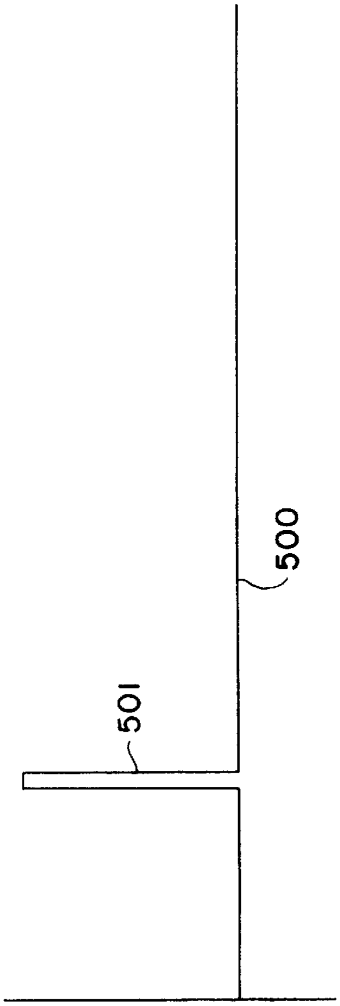
FIGS. 5, 6, and 7 are timing diagrams of the signals used to generate the lines of FIG. 4.
Figure 6:
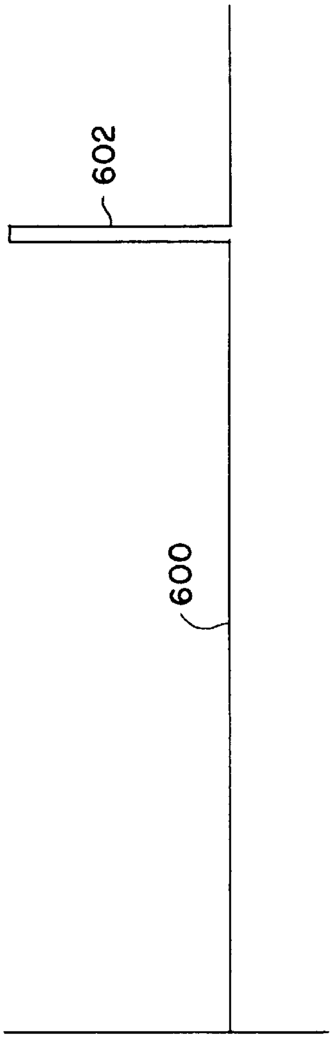
Figure 7:
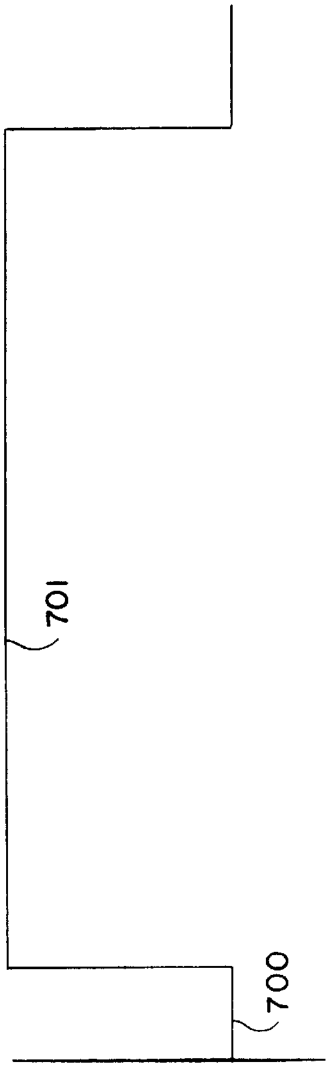

Timing diagrams of the signals which generate the calibration lines 401–404 are shown in FIGS. 5–7. In FIG. 5, the pulse 501 of signal 500 represents, for example, the single pixel 510 of line 401 of FIG. 4 having a particular color, for example, red. The height of the pulse 501 exceeds a predetermined reference signal. For example, if maximum illumination is achieved at 1.0 volts, then the predetermined reference signal to be exceeded can be 0.5 volts. The signal 500 can be generated for each vertical position of the horizontal scan lines 310 of FIG. 3 to generate the calibration line 401.

The pulse 602 of signal 600 of FIG. 6 is similarly used to display the pixel 610 of FIG. 4. Multiple generations of the signal 600 can generate the second calibration line 402.

The calibration lines 403 and 404 (FIG. 4) are generated by signals as substantially shown in FIG. 7. The pulse 701 exceeds the predetermined reference signal for the entire calibration line 403 to illuminate all the pixels at a first vertical position. A similar signal can be used to generate the line 404 at a second vertical position.

Figure 8:
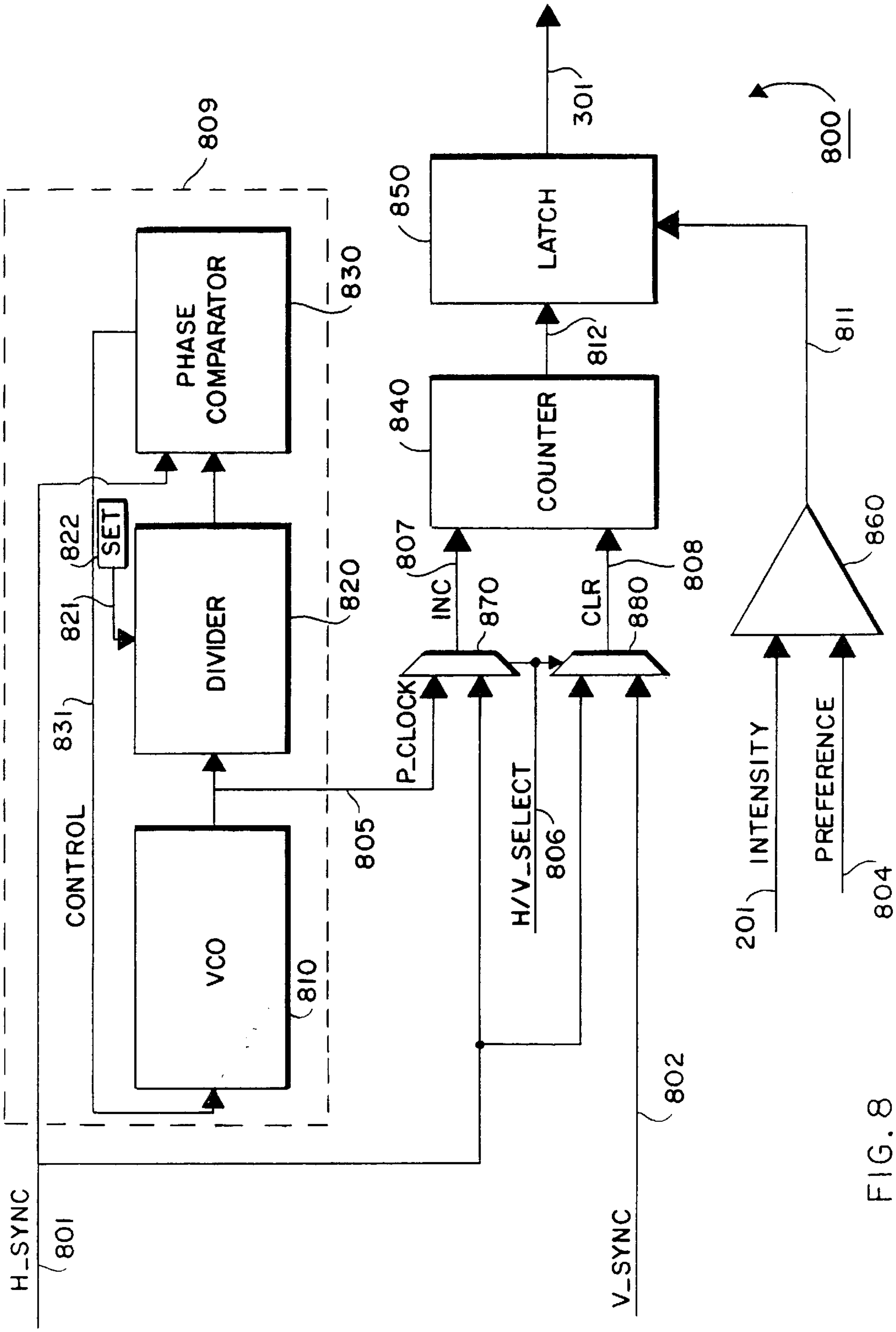
FIG. 8 is a block diagram of a calibration unit.

The calibration unit 800 according to a preferred embodiment of the invention is shown in FIG. 8. The arrangement 800 includes a phase-lock loop (PLL) circuit 809, a counter 840, a register or latch 850, a voltage comparator 860, and multiplexors (MUX) 870 and 880.

The calibration unit 800 can be used to measure the relative horizontal and vertical positions of the calibration lines 401–404 (FIG. 4) generated by the independent video adapter 200 (FIG. 2) in terms of the frequency of the pixel clock signals of the dependent adapter 290.

Generally, during a calibration operation, the unit 800 counts the number of pixel clock pulses (P_CLOCK) on line 805 with respect to a single horizontal synchronization pulse (H_SYNC) 801, or the number of H_SYNC pulses with respect to a single vertical synchronization pulse (V_SYNC) on line 802. The P_CLOCK pulses are generated by the PLL circuit 809 to be synchronous with the H_SYNC signal on line 801. The frequency of the P_CLOCK pulses is based on the ratio of the number of pixels per scan line. If the video signal is composite, the H_SYNC and V_SYNC pulses can be extracted from the color signal using standard broadcast signal decomposing techniques, for example, detecting negative video pulses.

While counting the number of P-CLOCK and H_SYNC pulses, the intensity component of the video signal (INTENSITY) on line 201 is monitored by the comparator 860. If the intensity of the video signal exceeds the predetermined reference voltage (REFERENCE) 804, for example, 0.5 volts, a pulse is generated on line 811. The pulse on line 811 causes the latch 850 to capture a current count "i" of the counter 840 via line 812. The counts "i" can be presented to the dependent video adapter 290 on line 301 as calibration parameters.

More specifically, the PLL 809 can comprise a voltage-controlled oscillator (VCO) 810, a divider 820, and a phase comparator 830. The divider 820 can be set to divide by an integer number "n" supplied on line 821 as a set signal. The set signal can be derived from a software programmable register 822 of the calibration unit 800. The PLL 809 generates "n" P_CLOCK pulses for every H_SYNC pulse. The divider 820 "divides" the H_SYNC signal by "n."

For example, if one horizontal scan line 310 of FIG. 3 can accommodate 640 pixels generated by the independent adapter 200, then "n" is some value larger than 640 to compensate for the blanking areas at the left and right of the monitor. Typically, the size of the horizontal blanking area is about 15% of the width of the screen. Therefore, in this example, "n" can have an initial value of 740. This means, that 740 P_CLOCK pulses are generated by the PLL circuit 809 for every horizontal scan line.

The phase comparator 830 is used to compare the frequency of the input signals, and generate an output CONTROL on line 831, which is a measure of their phase difference. This phase correction signal can be used to deviate the VCO 810 to "lock" the phase of the input signals, e.g., H_SYNC and P_CLOCK.

Whether the horizontal (401) or vertical (403–404) calibration lines are being calibrated is determined by a H/V_SELECT signal on line 806 controlling MUX 870 and 880.

While calibrating vertical line 401–402, the MUX 870 selects the P_CLOCK pulse for counting as signal INC on line 807. In this case, the H_SYNC pulses, via MUX 880, are used to reset the counter 840 using the CLR signal on line 808.

While calibrating horizontal lines 403–404, the MUX 870 selects the H_SYNC pulses for counting as signal INC on line 807. In this case, the V_SYNC pulses, via MUX 880, are used to reset the counter 840 using the CLR signal on line 808.

A current count "i" of the counter 840 is captured by latch 850 when the intensity of the video signal exceeds the predetermined reference signal as determined by the comparator 860. Four sequential counts of "i," for lines 401–404 respectively, determine the calibration parameters of line 301. The calibration parameters express the dimensional characteristics of the independent adapter 200 in terms of pixel clock frequency of the dependent adapter 290.

During operation of the system 100, the dependent video adapter 290, based on the calibration parameters, can adjust the rate and position of its pixel generation to substantially coincide with the rate and position at which pixels of the independent adapter 200 are generated. Furthermore, the dependent adapter 290 can generate its pixel signals to substantially coincide with a window generated by the independent adapter 200.

For example, the software programs of the host 110, using PC windowing techniques, can direct the independent adapter 200 to create a graphic image including a "black hole" through which the images of the dependent adapter 290 are to be viewed. The hole can be created by storing black pixels at appropriate locations of the RAM 240. The black pixels will be converted to, for example, 0.0 volt color signals by the DAC 280.

The dependent adapter 290, knowing the dimensional characteristics of the independent adapter 200 as expressed by the calibration parameters, can now generate its pixels to substantially coincide with the "black" pixels of the window. Outside the window, the dependent adapter 290 generates 0.0 volt color signals. As an advantage, the merge unit 900, according to the preferred embodiment of the invention, can simply overlay the signals on lines 202 and 203 without the use of complex chroma-keying techniques, as generally required for merging video signals produced by adapters of the prior art.

Figure 9:
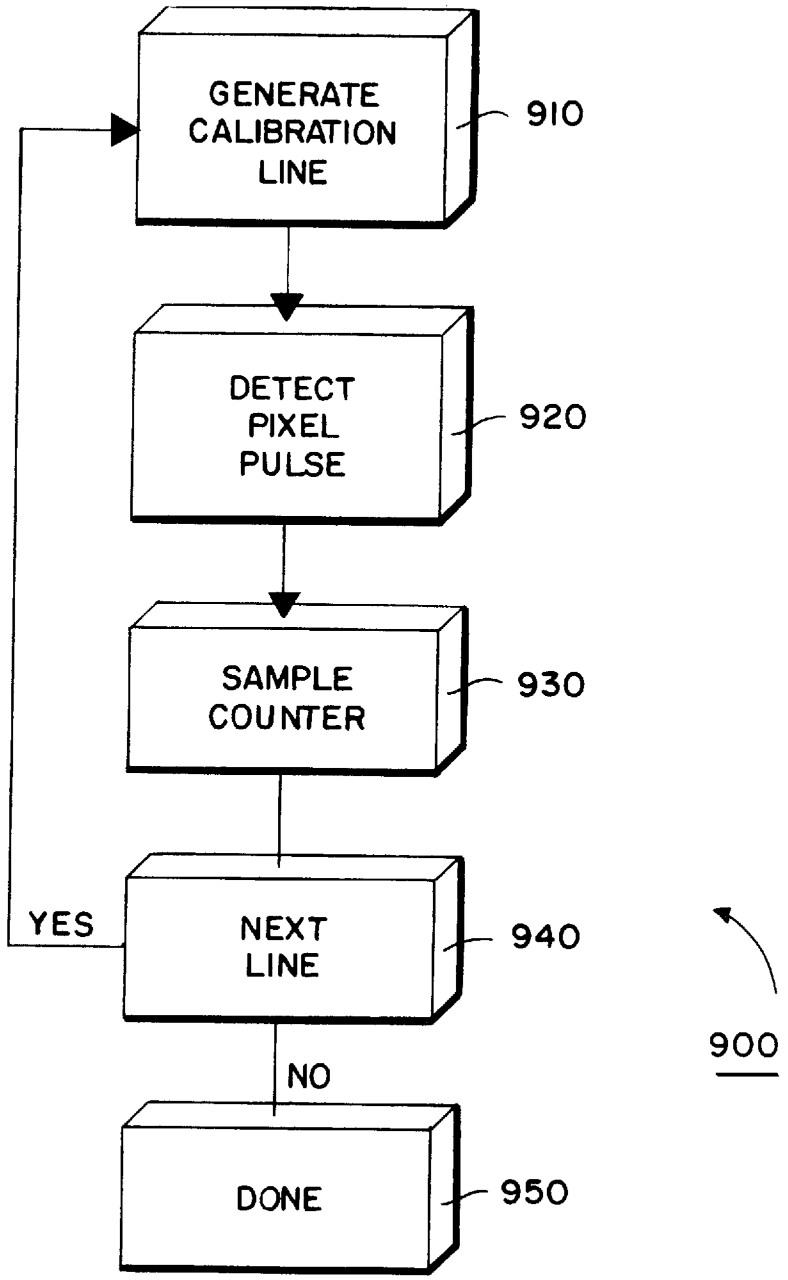
FIG. 9 is a flow diagram of a process used during the operation of the unit of FIG. 8.

FIG. 9 shows the process steps of a procedure 900 that can be used to perform the calibration of the video signals generated by the independent adapter 200. The procedure 900 can be executed during installation of the dependent adapter 290.

In step 910, the independent video adapter 200 generates a calibration line, for example line 401. The adapter 200 can be controlled by a conventional window manager such as the Microsoft "Windows" program. The position of the non-black video signals, e.g., signals exceeding the predetermined reference signal of 0.5 volts, are detected in step 920. This event can be signaled as, for example, an interrupt signal derived from line 811 of FIG. 8. Alternatively, each of the calibration lines 401–404 can be displayed for a predetermined time interval for example, one second, using a timer.

In response to the detection of the calibration pulse, or at fixed timer intervals, the current count "i" of the counter 840 as stored in the latch 850 is sampled. Each of the lines 401–404 can be separately calibrated by looping through step 940 until done in step 950.

The position of the horizontal calibration lines 401 are determined with respect to the P_CLOCK pulses, and the position of the vertical calibration line 403–404 are determined with respect to the H-SYNC pulses. For example, if the independent adapter 200 is directed to draw the left vertical calibration line 401 along the left-most edge of the viewing window 300 of FIG. 3, and the pixel color signal pulse 501 is detected with respect to a current count "i" of 30, then the "width" of the left vertical blanking area 370 is thirty pixels.

Horizontal or vertical calibration can be selected by setting or clearing a bit in a register coupled to line 806 carrying the H/V_SELECT signal. Thus, the dimensional characteristics of the independent adapter 200 can be determined to a high degree of accuracy.

The procedure may be as elaborate as needed to capture any non-linearities present in the independent video adapter 200. For example, the number and spacing of the horizontal and vertical calibration lines can be adjusted for a particular implementation.

Although a preferred embodiment of the invention has been shown and described, it will be readily apparent to those skilled in the art that various modifications may be made therein without departing from the spirit of the invention or the scope of the appended claims.

I claim:

1. An apparatus for calibrating video signals generated by a first video adapter of a computer system, the first video adapter generating video signals having first dimensional characteristics, comprising:

means for generating a plurality of calibration lines using the first video adapter, the plurality of calibration lines to be displayed at predetermined horizontal and vertical positions of a display device, each of the plurality of calibration lines including pixel signals, the pixel signals exceeding a predetermined reference signal;

means, connected to the means for generating, for detecting the pixel signals exceeding the predetermined reference signal;

counting means, connected to the means for detecting, for determining the horizontal and vertical positions of the detected pixel signals as calibration parameters;

means for presenting the calibration parameters to a second video adapter, the second video adapter generating video signals having second dimensional characteristics that are different than the first dimensional characteristics of the video signals generated by the first video adapter.

2. The apparatus of claim 1 wherein the plurality of calibration lines include horizontal calibration lines and vertical calibration lines and further comprising:

a first multiplexor connected to produce an increment signal for the counter from either a horizontal synchronization signal or a pixel clock signal, the horizontal synchronization signal generated by the first video adapter, and the pixel clock signal derived from the horizontal synchronization signal;

a second multiplexor connected to produce a clear signal for the counter from either a vertical synchronization signal or the horizontal synchronization signal, the vertical synchronization signal generated by the first video adapter; and means, connected to the first and second multiplexors for selecting either the pixel clock signal for counting and the horizontal synchronization signal for clearing while determining the horizontal position of the pixel signals of the horizontal calibration lines, or the horizontal synchronization signal for counting and the horizontal synchronization signal for clearing while determining the vertical positions of the pixel signals of the vertical calibration lines.

3. The apparatus of claim 2 further comprising:

latch means, connected to the counter, for storing a count representing the horizontal positions and the vertical positions of the pixel signals of the calibration lines.

4. The apparatus of claim 3 wherein the means for detecting the pixel signals is a comparator receiving the predetermined reference signal and the pixel signals, an output of the comparator connected to the latch, the output of the comparator to cause the latch to store the count representing the horizontal positions and the vertical positions of the pixel signals of the calibration lines.

5. The apparatus of claim 2 further comprising:

a phase-lock loop circuit connected to the first video adapter derive the pixel clock signal from the horizontal synchronization signal.

6. The apparatus of claim 5 wherein the phase-lock loop circuit includes a voltage-controlled oscillator, a divider, and a comparator, the comparator producing an output signal for the voltage-controlled oscillator, the output signal being a measure of a phase difference between the horizontal synchronization signal and the pixel clock signal.

7. The apparatus of claim 1 further comprising:

means, connected to the first and second adapters, for merging the pixel signals generated by the first and second video adapters into merged video signals, the pixel signals generated by the second video adapter to be substantially coincident with the first dimensional characteristics of the video signals of the first adapter, the merged video signals to be displayed on the display device.

* * * * *